G. H. SCHERFF.
ILLUMINATION CONTROLLER.
APPLICATION FILED OCT. 9, 1915.
1,212,115.
Patented Jan. 9, 1917.
3 SHEETS—SHEET 2.
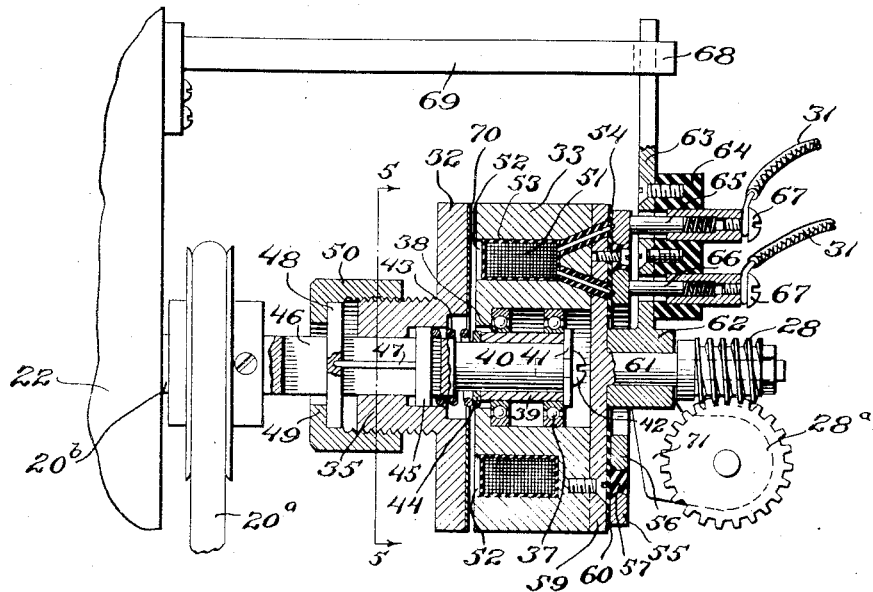
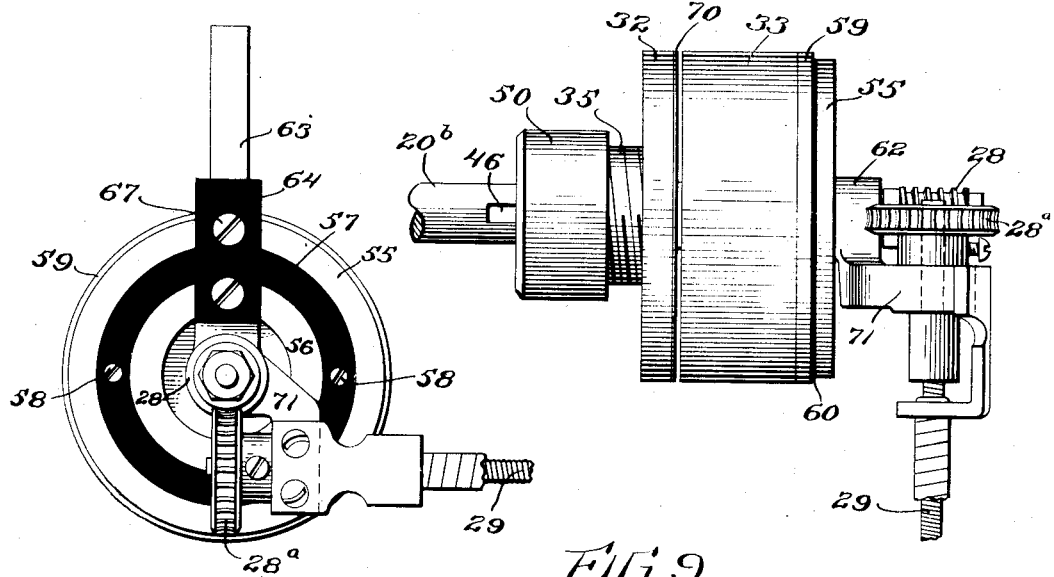
Witness
G. M. Fogner.
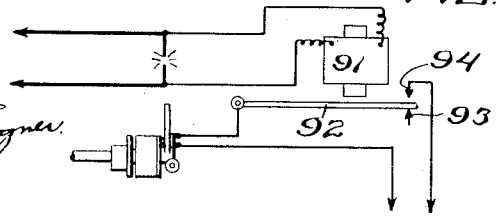
Inventor
Geo. H. Scherff.
By R. F. Steward
his Attorney G. H. SCHERFF.
ILLUMINATION CONTROLLER.
APPLICATION FILED OCT. 9, 1915.
1,212,115.
Patented Jan. 9, 1917.
3 SHEETS—SHEET 3.
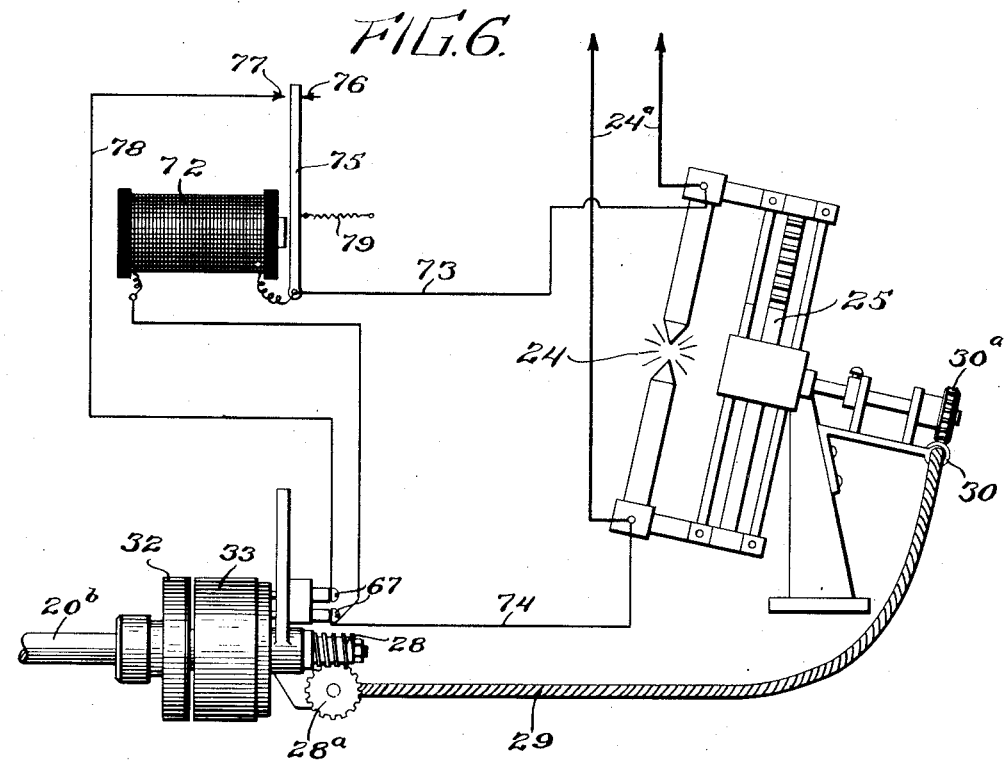
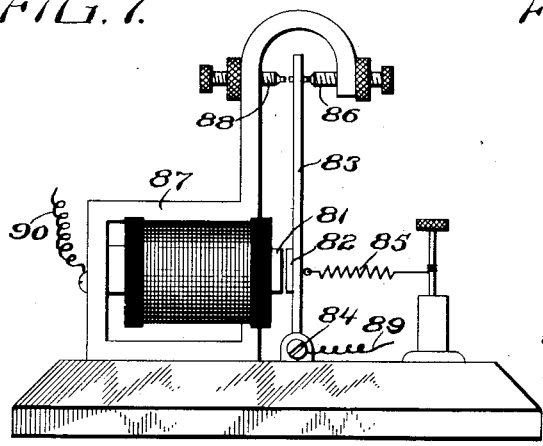
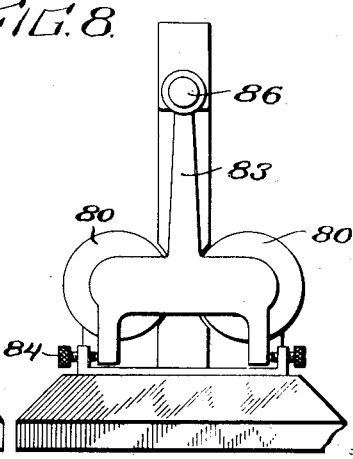
Inventor
Geo. H. Scherff.

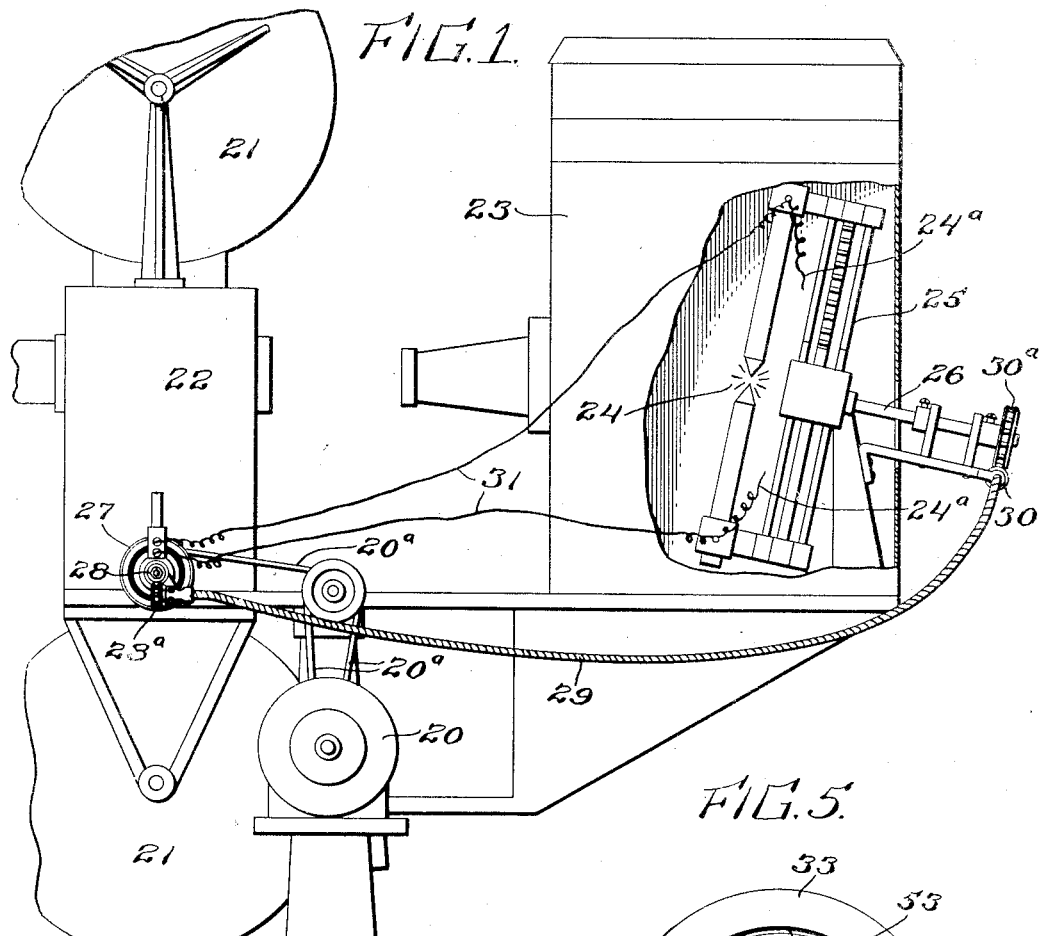

UNITED STATES PATENT OFFICE.

GEORGE H. SCHERFF, OF NEW YORK, N. Y., ASSIGNOR, BY MESNE ASSIGNMENTS, TO GEORGE H. SCHERFF & COMPANY, INC., OF BROOKLYN, NEW YORK, A CORPORATION OF NEW YORK.

ILLUMINATION-CONTROLLER.

1,212,115.  Specification of Letters Patent.  Patented Jan. 9, 1917.

Application filed October 9, 1915.   Serial No. 55,040.

*To all whom it may concern:*

Be it known that I, GEORGE H. SCHERFF, a citizen of the United States, and residing at New York, in the county of New York and State of New York, have invented certain new and useful Improvements in Illumination-Controllers; and I do hereby declare the following to be a full, clear, and exact description of the invention, such as will enable others skilled in the art to which it appertains to make and use the same.

This invention relates to illumination controllers, and more especially to controllers useful for regulating and controlling the voltage over an arc, filament, or other source of illumination which is dependent for its operation upon the maintenance of impressed voltages.

The broad principles of the invention are capable of mechanical embodiment in a variety of different forms; and the scope of the appended claims is therefore to be understood as correspondingly broad.

In order to make clear the principles of the invention, I shall describe a specific adaptation of the same to arc control in projection apparatus, specifically motion picture apparatus, for which use the invention is particularly suited and productive of desirable results.

The importance of maintaining constant the intensity of the illuminating arc in motion picture projecting apparatus is well known. As the carbons or electrodes of the arc light are consumed, however, and as the distance between them increases, the voltage across the arc increases and the current diminishes, thus lessening the intensity of illumination. Furthermore, since the positive carbon is consumed faster than the negative carbon, the center of illumination thereby tends to shift away from the axis of projection where, as is commonly the case, the carbons are alined in a plane transverse to said axis. It is necessary therefore to provide means for feeding the carbons toward each other whenever such adjustment is required to maintain constant the illuminating power of the arc, or to maintain its position constant. Several types of such carbon-feeding means have been proposed, some operated manually and others automatically. An automatically operated system for this purpose, employed heretofore to some extent, involves the use of a special motor arranged to drive the carbon-feeding mechanism proper, the operation of said motor being controlled by variations in the voltage across the arc. In automatic systems heretofore proposed, therefore, where the film-moving mechanism is motor operated, two motors are required, one for arc regulation and the other for moving the film. Where the film-moving mechanism is hand operated, a motor for arc regulation is nevertheless an essential component of such systems.

One of the objects of my invention is to provide for automatic regulation of the brilliancy of an arc or other illumination source, without the necessity of employing a special motor to drive the regulating means.

Another object is to enable regulation to be effected within a smaller range of changes in illumination intensity than has been practicable heretofore, whereby perfect steadiness of illuminating power is more nearly approached; and this may be accomplished in conjunction with or independently of the attainment of the first-named object of the invention.

According to the present invention the feeding of the carbons toward each other is effected automatically through mechanism controlled by the voltage across the arc or, alternatively, by the volume of current therethrough. Instead of employing a special motor to drive the feed mechanism, however, this is effected from a moving part, driving or driven, of the film-moving or reeling apparatus of the motion picture machine. Thus if said apparatus includes a driving motor, it is most convenient to provide clutch means of some kind automatically operable upon slight variation in electrical conditions at the arc, such as a small increase in voltage across the arc, to connect the motor shaft or some other moving part of the apparatus in driving relation to the carbon-feeding or regulating mechanism, the clutch means being arranged to be thrown out automatically as soon as the voltage has been restored to the desired normal value. Said clutch means may be controlled and actuated electromagnetically by suitable direct electrical connections to the arc circuit; or a sensitive relay may be employed. Furthermore the control may be effected through variations in the arc current instead of by voltage variations, in which case the controlling circuit connections may be either in series or in parallel with the arc. In any case, the control of the clutch operation should be such as to minimize fluctuations in the illumination intensity of the arc; and hence, the clutch-operating mechanism should be so constructed and adjusted as to be responsive to relatively very slight changes in voltage or current conditions in the arc.

The invention therefore also contemplates novel features of construction in clutch and relay devices of special value for present purposes, as well as a novel method of controlling such devices, especially in connection with the motion picture art.

In order to afford a fuller understanding of the invention, a typical embodiment thereof as applied to motion picture apparatus is shown in the accompanying drawings, in which—

Figure 1 is a general view in elevation, partly broken away, of motion picture apparatus embodying the invention; Fig. 2 is a side view of the clutch mechanism and associated parts; Fig. 3 is a central longitudinal section of the same, parts being shown in elevation; Fig. 4 is an end view of the clutch mechanism shown in Fig. 3; Fig. 5 is a view of the opposite end of the clutch, in section on the line 5—5 of Fig. 3, and partly broken away; Fig. 6 shows more or less diagrammatically another embodiment of the invention in which the operation of the clutch mechanism is controlled through a relay; Fig. 7 illustrates a special type of relay which may be employed to advantage, the view being a side elevation; Fig. 8 is an end elevation of the relay of Fig. 7; Fig. 9 illustrates diagrammatically a form of relay adapted for use with alternating current; and Fig. 10 shows a typical magnetization curve to be hereinafter referred to.

Referring to the drawings, Fig. 1 illustrates the application of my invention to projection apparatus for displaying motion pictures. In the present example the picture-moving apparatus is power-operated and includes the motor 20 which is connected by suitable transmission mechanism, such as one or more belts 20ª to the driving shaft 20ᵇ which actuates the film reels, these latter being shown conventionally at 21 above and below a suitable intermediate housing 22, through which the film passes from one reel to the other. The arc lamp housing is indicated at 23, and the arc at 24; while the means for feeding the arc carbons may be of any well known or suitable type, as illustrated conventionally at 25. The carbon-feeding device has an operating shaft 26 which is arranged to be driven intermittently through automatically controlled transmission means from the reel-driving shaft 20ᵇ (Figs. 2 and 3) of the picture-moving apparatus. The transmission illustrated in Fig. 1 comprises magnetic clutch means 27 mounted on shaft 20ᵇ and operable to drive the arc regulator shaft 26 through worm 28, worm wheel 28ª, flexible shaft 29, worm 30 and worm wheel 30ª. Said clutch means is so constructed and arranged that upon substantial variation in illumination intensity of the arc, that is, upon variation in electrical conditions at the arc, the clutch means will be actuated to place the film-moving mechanism in driving relation to the arc-regulating device, provision being also made as hereinafter set forth to effect disengagement of the clutch when the regulating device shall have been operated sufficiently to restore normal conditions at the arc. As here illustrated, the control of the magnetic clutch mechanism depends upon the voltage across the arc, and to this end said clutch mechanism is connected by leads 31 to the respective carbons or electrodes of the arc.

Referring now more particularly to Figs. 2 to 5, the clutch mechanism 27 of Fig. 1 is shown in detail as comprising a fixed or relatively stationary member 32 and a relatively movable member 33 both carried on the operating shaft 20ᵇ of the film-reeling mechanism. The fixed clutch member 32 is in the form of a disk provided with a projecting hub or sleeve 35 which is secured as by means of counter-sunk set screws 36 to shaft 20ᵇ so as to rotate with the latter and to be incapable of relative movement longitudinally thereof. Both clutch members may be formed of any suitable magnetic material such as cast iron, steel, or the like. Clutch member 33 is loosely mounted on shaft 20ᵇ in such manner as normally to remain idle while shaft 20ᵇ is rotated, and it is also capable of slight longitudinal movement relative to said shaft for the purpose of engaging fixed clutch member 32 to close the clutch and thereby to drive the arc regulator. In the present construction, clutch member 33 is carried by antifriction bearings 37 of which the inner members or rings 38 are supported on a sleeve 39 fitting snugly on a reduced portion 40 of shaft 20ᵇ, but slidable longitudinally thereon. Appropriate means such as collar 41 secured to the shaft by screws 42 limits movement of sleeve 39, and hence of the entire movable clutch member, to the right, as seen in Fig. 3. The clutch parts are normally maintained in the position shown by the thrust of spring 43 which surrounds the shaft and lies in a suitable recess provided in clutch disk 32. Said spring is compressed between a washer 44 at the end of sleeve 39 and a movable abutment pin 45 working in the aforesaid recess in the clutch disk and in a slot 46 provided in the shaft. The position of this abutment pin 45 may be varied by any convenient means to adjust the degree of spring compression. As here shown such means comprise a thrust pin 47 which extends longitudinally in slot 46 between cross pin 45 and another cross pin 48, this latter also passing through slot 46 and engaging flange 49 of a threaded regulating nut or collar 50 which works on the outer threaded surface of the hub 35. By screwing this nut in or out, the pressure of the clutch spring 44 may be increased or diminished at will to hold the movable clutch member 33 away from fixed clutch member 32 with any desired degree of force.

For the purpose of automatically actuating the clutch and thereby connecting the arc regulator in driven relation to the mechanism for moving the picture film or other carrier of representations to be projected, I provide one or the other of the clutch members with magnet coils or windings suitably connected to the arc for energization thereby. The magnet coils are here shown as mounted at 51 on the movable clutch member, which therefore constitutes an electromagnet, while the fixed clutch member constitutes the magnet armature. Obviously this arrangement could be reversed. The magnet coils are located in a deep recess 52 provided in the body of the movable clutch member 33 and are suitably insulated therefrom as at 53. The winding terminals 54 are led from the magnet coils to contact rings 55 and 56 which are held in spaced relation by an insulating ring 57, this latter being secured by screws 58 or the like to end plate 59 of the movable clutch member. Insulation 60 is provided between the contact rings and plate 59. The plate 59 carries a stud 61 upon which bears loosely the hub 62 of a brush carrier 63. Said brush carrier is provided with a block of insulation 64 through which extend spring pressed brushes 65 and 66 making contact, respectively, with contact rings 55 and 56 before described. Leads 31 connecting the magnet coils with the arc may be brought to binding screws 67. Brush holder 63 may be extended, as shown, for engagement with the forked end 68 of a stop arm 69, whereby undesirable movement of the brush holder about the stud 61 may be prevented.

Returning to the electromagnet construction, several important points are to be taken into consideration. First, the electromagnet should be so designed that the iron will not be magnetized to the saturation point when, under the given operating conditions, the amount of current corresponding to normal conditions at the arc is flowing through the magnetizing coil, but that the electromagnet will operate on the steepest part of its magnetization curve; that is, where the variations in magnetic pull are greatest for given changes in voltage (i. e. strength of field).

Expressed otherwise, in order for the clutch to operate properly and to effect close regulation of the arc, the electromagnet should be so designed and operated that small changes in voltage or other current conditions at the arc, and consequently small changes in illuminating power or brilliancy, will occasion the greatest possible changes in magnetic flux density. Thus, if the magnetization curve be as shown in Fig. 10, the electromagnet may be arranged to operate over the range between points P and P', for example, where small changes in the magnetizing force H produce comparatively large changes in flux density B. Another point to be observed in the construction of the electromagnet is that the magnetic leakage between clutch disk 32 and the electromagnet or movable clutch member 33 should be of such magnitude that the clutch will be most sensitive to changes in the magnetizing force. From this it follows that, in order to maintain the sensitiveness of the clutch as constant as possible, a gap should always exist between electromagnet 33 and clutch disk 32, and in order to provide such a gap when the clutch is closed, a layer 70 of non-magnetic material, such as wood, brass, or the like, of suitable thickness, is inserted between members 32 and 33, being fastened to the face of either of them and in the present case shown fastened to the face of disk 32. Furthermore, as the sensitiveness of the clutch depends upon a given magnetic leakage, it is desirable to vary the leakage as little as possible, and therefore the lateral movement of clutch member 33 relative to clutch disk 32 should be as small as possible; that is, the air gap between the non-magnetic material and clutch member 33 should be very small.

It is evident that when the magnet coils 51 are energized to the necessary extent, the resulting magnetic pull will draw the movable clutch member 33 into operative engagement with the working face of clutch disk 32, and under these circumstances the movable clutch member will rotate with disk 32 which is fast with the drive shaft $20^b$. For the purpose of transmitting this motion of clutch member 33 to the carbon-feeding mechanism, the stud or spindle 61 carries the aforesaid worm 28 keyed or otherwise suitably secured thereto, said worm driving worm wheel $28^a$, which may be conveniently mounted on a bracket 71 carried by the hub 62 of the brush holder, and said worm wheel in turn driving flexible shaft 29, worm gear 30, $30^a$, and shaft 26, all as previously described, thereby operating the carbon-feeding mechanism 25 as long as the magnetic clutch remains closed. When the arc carbons or electrodes have been fed toward each other sufficiently to reduce the voltage across the arc to a predetermined normal maximum, the pull of electromagnet 33 becomes insufficient to resist the thrust of the clutch spring 38, whereupon the clutch is opened and movement of the carbon-feeding mechanism ceases. As soon as the carbons have again burned away sufficiently to raise the voltage slightly, the pull of the electromagnet again overcomes the thrust of the clutch spring, closing the clutch and actuating the carbon-feeding device. In practice I find that by proper design and adjustment of the apparatus, the variations in voltage sufficient to cause the described intermittent clutch operation and consequent regulation of the arc may be kept well within one volt where the operation of said clutch is dependent upon the voltage over the arc. Where such control depends upon changes in current rather than voltage, the variations may be kept correspondingly small. It is evident that the illuminating power of the arc may therefore be maintained substantially constant by means operating entirely automatically and without the necessity of employing a special motor for the purpose as has been the custom heretofore.

It is evident that the clutch mechanism described may be employed with a manually operated motion picture machine, the motor 20 being in that case simply replaced by a hand crank or the like. Obviously the particular location at which the clutch mechanism is operatively connected to the film moving means is also immaterial. Thus in the arrangement here shown, said clutch mechanism could equally well be mounted on the shaft of motor 20, provision being made of course for suitable speed reducing gearing in the transmission means connected to the carbon-feeding device.

Fig. 6 illustrates somewhat diagrammatically a modification of the invention, in which a relay is arranged to control the magnetic clutch circuit, the relay itself being connected to the electrodes of the arc and being actuated by changes in voltage across the arc. The coil terminals of the relay magnet 72 are connected across the arc by leads 73, 74; while the pivoted relay arm 75 is connected at one end to one of the lighting mains by lead 23 and has its other end movable between a stop 76 and a contact terminal 77. Said contact terminal is connected through lead 78 to one winding terminal 67 of magnetic clutch device 32, 33. The other clutch winding terminal is connected to the opposite lighting main. When the voltage over the arc rises due to burning away of the carbons, relay coil 72 is energized sufficiently to pull relay arm 75 against the restraining tension of spring 79 and to draw said arm against contact 77, thus closing the circuit through the magnetic clutch and setting in operation the carbon-feeding mechanism in the manner before described.

While I do not desire to limit myself to the employment of any special type of relay, the relay should in general be very sensitive to slight changes in voltage across the arc. A preferred form of relay device for this purpose is illustrated in Figs. 7 and 8. In this form of relay two coils 80 are connected in series and are provided with terminals (not shown) for connection to the electrodes of the arc. The cores 81 of these coils are adapted, when sufficiently energized, to attract armature 82 carried by an arm 83 pivoted at 84, said arm being normally drawn away from the cores by a spring 85 and into contact with adjustable insulated stop 86, said stop being carried by a brass yoke 87. Said yoke also carries an adjustable contact 88 against which conductive arm 83 is adapted to be drawn into contact when the voltage over the arc rises to a point where the relay coils are energized sufficiently to overcome the spring 85. Leads 89 and 90 connect the relay arm and yoke 87 in circuit with a magnetic clutch device, which may be of the character hereinbefore described, and with a source of current which may conveniently be the lighting mains supplying the arc.

When the circuit is completed by attraction of arm 83 into contact with 88, the magnet circuit is closed, and the magnetic clutch device being energized, thereupon operates to transmit motion from a driving or driven member of the film-moving means to the carbon-feeding mechanism. The adjustment is such that upon fall of the arc voltage to normal, the relay arm 83 is retracted by its controlling spring to break the magnetic clutch circuit, and the feeding of the carbons is thereby discontinued. It is to be noted that when the relay arm 83 is attracted to close the clutch circuit, the distance traveled by that portion of the arm directly opposite cores 81 is relatively small, thus insuring sensitiveness of operation. On the other hand, the distance traveled by the upper or contact end of the arm is comparatively large, thus preventing arcing. The arm may of course be pivoted at a point intermediate its ends instead of at one end as here shown, and in such case it is desirable to have the lever arms of unequal length, the relay armature being carried by the shorter arm and therefore having a small limit of travel as compared to the longer arm. Obviously, it is important to observe in the construction of the relays the same conditions of magnetization and magnetic leakage that have been described for the magnetic clutch.

In the specific embodiments of the invention hereinbefore described, the clutch mechanism is controlled either directly by the voltage across the arc, or else indirectly by a voltage controlled relay. It is clear, however, that by suitable modifications within the skill of those versed in the art, the control of the clutch mechanism may be effected by variations in the flow of current in the arc circuit instead of by the voltage across the arc. However, since the current in the arc diminishes with the voltage across the arc, it is apparent that the principle of operation, both in the directly controlled and relay controlled arrangements, will be practically the reverse of that described in connection with voltage control. That is to say, the part or parts adapted to move and thereby to close the clutch or close the circuit operating the clutch will be normally restrained from such movement by an electromagnet arranged either in series or in parallel with the arc, and will be moved into operative position only upon predetermined diminution in the amount of current passing through the arc or in parallel therewith. It is deemed unnecessary to illustrate here the mechanical modifications necessary to adapt the apparatus already described for control by current in place of voltage.

In Fig. 9 is illustrated diagrammatically a form of relay suitable for use with alternating current in place of the relay shown in Figs. 6–8. The relay coil 91 is connected across the arc as before, but the relay arm 92 is controlled by gravity, resting normally against the insulated stop 93. When the coil is sufficiently energized, the relay arm is drawn upwardly to close a power circuit through contact 94 and thereby to actuate a clutch or a motor whereby the carbon-feeding mechanism is brought into operation, the relay arm being released and breaking the power circuit as soon as normal voltage over the arc is restored. Where the relay is controlled by the volume of the arc current, the arrangement is similar except that the relay arm is normally held up by the magnet, the power circuit being closed only when the current diminishes, causing the relay arm to be released. Gravity control of the relay arm is much superior to spring control when alternating current is used.

What I claim is:

1. In projection apparatus, the combination, with picture-moving means and an illumination source associated therewith, of regulating mechanism operable to adjust the brilliancy of said source, and transmission means automatically operable in response to fluctuations in the brilliancy of said source to connect said regulating mechanism in driven relation to said picture-moving means, provision being made for automatically effecting disconnection when the desired adjustment is accomplished.

2. In projection apparatus, the combination, with picture-moving means and a projecting arc associated therewith, of regulating mechanism operable to adjust the brilliancy of said arc, and transmission means automatically operable in response to fluctuations in the brilliancy of said arc and arranged to connect said regulating mechanism in driven relation to said picture-moving means, provision being made for automatically effecting disconnection when the desired adjustment is accomplished.

3. In projection apparatus, the combination, with picture-moving means and a projecting arc associated therewith, of mechanism for feeding the arc carbons, magnetic clutch means interposed between said picture-moving means and the carbon-feeding mechanism, said clutch means being normally idle, and electrical connections between said clutch means and said arc, whereby upon suitable fluctuation of current conditions in the arc said clutch means is actuated and the picture-moving means is caused to drive the carbon-feeding means.

4. In motion picture apparatus, the combination, with film-moving means and a projecting arc associated therewith, of a device for regulating the length of the arc, transmission means including a normally open magnetic clutch interposed between said device and said film-moving means, and a clutch-operating circuit connected across the arc and arranged to close said clutch upon suitable change in voltage across the arc and thereby to place said film-moving means in driving relation to said arc-regulating device.

5. In motion picture apparatus, the combination, with film-moving means and a projecting arc associated therewith, of arc-regulating means, and clutch means controlled by the voltage across the arc and automatically operable upon sufficient variation of arc voltage from normal to connect said arc-regulating means to said film-moving means for operation by the latter, said clutch means being arranged automatically to effect disconnection when the arc voltage returns substantially to normal.

6. In motion picture apparatus, the combination, with film-moving means and a projecting arc associated therewith, of arc-regulating mechanism, clutch means operable to place said film-moving means in driving relation to said arc-regulating mechanism, and electrical means continuously energized by current derived from the arc circuit for controlling the operation of said clutch means, said electrical means being responsive to relatively slight changes in normal operating conditions at the arc and being arranged to cause operation of said clutch means when such changes occur.

7. In motion picture apparatus, the combination, with film-moving means and a projecting arc associated therewith, of arc-regulating mechanism, clutch means operable to place said film-moving means in driving relation to said arc-regulating mechanism, and clutch-controlling means including an electromagnet continuously energized by current derived from the arc circuit, said electromagnet being responsive to relatively slight changes in normal operating conditions at the arc and being arranged to cause operation of said clutch means when such changes occur.

8. In motion picture apparatus, the combination, with picture-moving means and a projecting arc associated therewith, of carbon-feeding mechanism associated with said arc, and means operable to connect said picture-moving means in driving relation to said carbon-feeding mechanism, the operation of such connecting means being controlled by the arc.

9. In motion picture apparatus, the combination, with picture-moving means and a projecting arc associated therewith, of carbon-feeding mechanism associated with said arc, and a clutch operable to connect said picture-moving means in driving relation to said carbon-feeding mechanism, the operation of said clutch being controlled by the arc.

10. In motion picture apparatus, the combination, with film-moving means and a projecting source of illumination associated therewith, of regulating mechanism for said source, normally idle transmission means between said film-moving means and said regulating mechanism, a relay controlled circuit for rendering said transmission means active, and electrical connections to the arc for governing the action of the relay.

11. In projection apparatus, the combination, with picture-moving means, a projecting arc and regulating mechanism therefor adapted to be driven by said picture-moving means, of an electromagnetic controlling device continuously energized to a variable extent by current derived from the arc and arranged upon suitable variation in current conditions at the arc to effect driving connection between said picture-moving means and said regulating mechanism, said electromagnetic device being arranged to operate at a location on its magnetization curve where slight changes in the magnetizing force produce relatively large changes in magnetic pull, whereby said device is rendered operatively responsive to small variations in electrical conditions at the arc.

12. In projection apparatus, the combination, with picture-moving means and a continuous but regulable source of illumination associated therewith, of regulating means for said source, and means whereby said regulating means may be connected to said picture-moving means for operation by the latter.

13. In projection apparatus, the combination, with picture-moving means and a projecting arc associated therewith, of arc-regulating mechanism and a clutch transmission whereby said arc-regulating mechanism may be connected to said picture-moving means for operation by the latter.

14. In projection apparatus, the combination, with regulable light-projecting means and mechanism for moving in front thereof representations to be projected, of regulating means for adjustment of said light-projecting means, and means controlled by said light-projecting means for automatically placing said mechanism in driving relation with said regulating means when adjustment is necessary.

In testimony whereof I hereunto affix my signature.

GEORGE H. SCHERFF.